May 11, 1954     C. H. OSLUND     2,678,218
UNIVERSAL EXPANSION CHUCK
Filed May 19, 1952
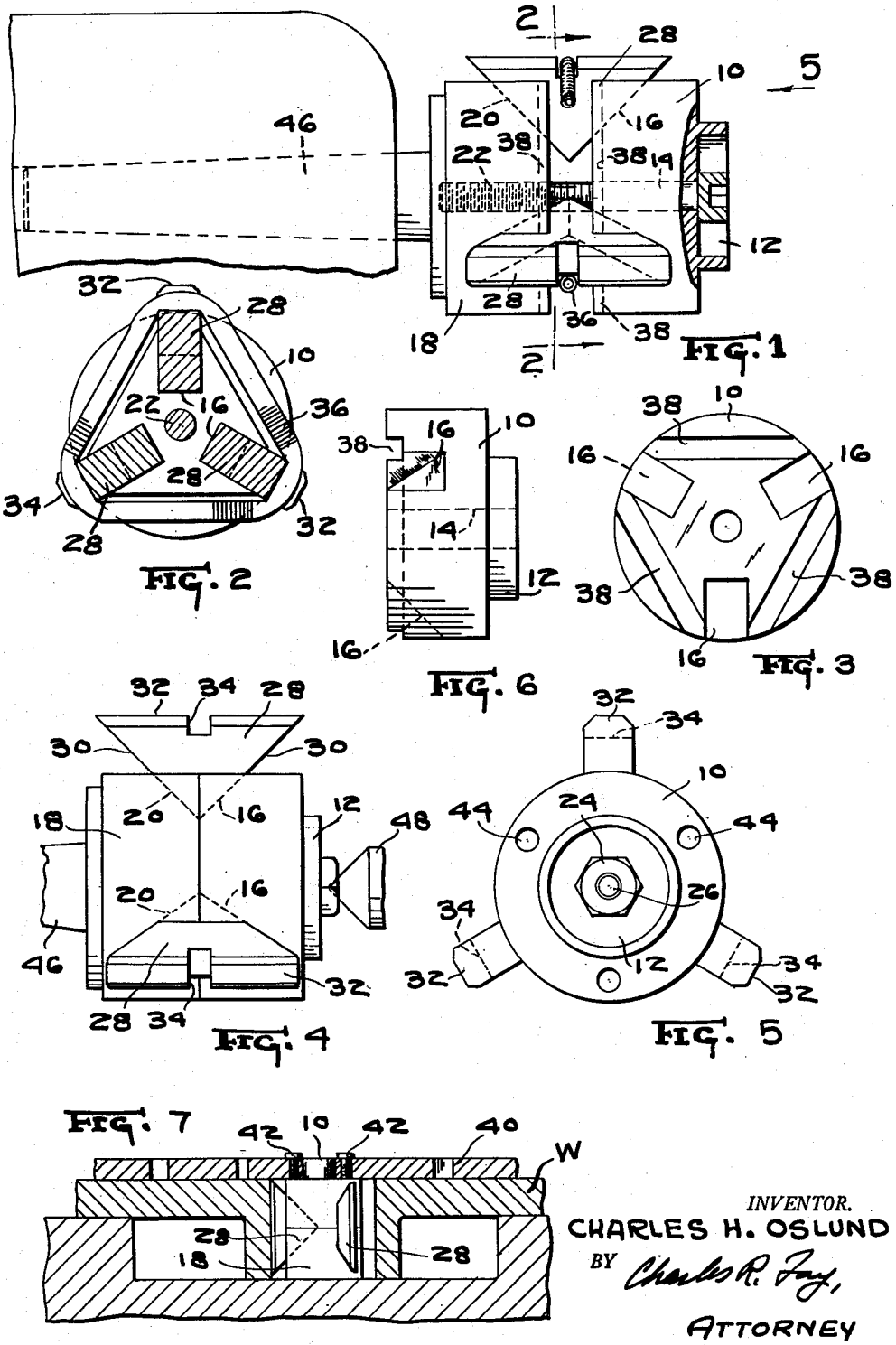
INVENTOR.
CHARLES H. OSLUND
BY
ATTORNEY

Patented May 11, 1954

2,678,218

UNITED STATES PATENT OFFICE 2,678,218

UNIVERSAL EXPANSION CHUCK

Charles H. Oslund, Holden, Mass.

Application May 19, 1952, Serial No. 288,590

1 Claim. (Cl. 279—2)

This invention relates to a universal expansion holding or chucking device provided with a plurality of radially arranged and radially movable and adjustable fingers for internally gripping any element having an interior bore or recess. This device is in the nature of an internal chuck and is adapted for use in machine tools as for instance in locating the drill plate containing the drill liners and for jigs and fixtures as well as in lathes, milling machines, etc. with the addition of an arbor or the like.

The principal object of the invention resides in the provision of a device as above described comprising a pair of circular axially aligned plates which are arranged on an axial support to be movable to and from each other as by means of a screw-threaded fastening or the like, said plates being provided with complementary longitudinally arranged inclined grooves which oppose each other in pairs, each pair containing a triangular gripping finger, each of said fingers being provided with an external straight surface arranged longitudinally of the device, the fingers being adapted for movement in and out as the plates are moved to and from each other, said fingers being particularly made to grip the interior walls of a bore or recess of any nature.

Other objects of the invention include the provision of a device as above described wherein the fingers are notched at their external gripping edges to receive a surrounding spring for automatically returning the fingers radially inwardly upon movement of the plates away from each other, and the plates themselves are provided with notches or grooves in their facing surfaces to receive the said spring in close engagement of the two plates for maximum adjustment so that the device can be used under a maximum range of diameters of the bores in which the device is used.

Other objects and advantages of the invention will appear hereinafter.

Reference is to be had to the accompanying drawings, in which

Fig. 1 is a view in side elevation of the device, parts being in section, illustrating the invention as used in the headstock of a lathe or similar machine;

Fig. 2 is a section on line 2—2 of Fig. 1;

Fig. 3 is a view in elevation of one of the plates;

Fig. 4 is a view in side elevation, illustrating the maximum diameter for adjustment of the gripping fingers;

Fig. 5 is a view in end elevation of the device, looking in the direction of arrow 5 in Fig. 1;

Fig. 6 is a view in side elevation of one of the plates; and

Fig. 7 is a sectional view showing the device applied to a drill guide-plate.

The present device comprises a cylindrical plate 10 having an annular ring or flat head axially arranged thereon at 12. The plate 10 is provided with a central axial bore 14 and at its side surface opposite the ring or head 12, it is provided with a plurality of slanting or inclined radially arranged grooves 16. These grooves are preferably at an angle of 45 degrees to the axis of the bore 14, but other degrees of inclination may be used without departing from the invention.

Another somewhat similar plate 18 is provided with complementary radial grooves 20 and together the grooves 16 and 20 provide triangular longitudinally arranged adjustable recesses in the two plates.

Some means is provided for adjusting the two plates 10 and 18 to and from each other axially and this may comprise a screw-threaded fastener 22 threaded axially in the plate 18 and passing freely through the axial bore 14 and plate 10. The fastener 22 may be provided with an Allen head, or it may comprise a hex-nut such as illustrated in Fig. 5 at 24 which has a conical center recess 26.

A series of triangular fingers, each generally indicated at 28, are arranged in the respective pairs of triangular slots 16, 20. Each finger 28 is provided with 90 degree angle surfaces 30 that ride in the bottoms of the slots 16, 20, and an external beveled gripping edge 32. The gripping edge 32 is particularly designed for performing the internal gripping action which is the main purpose of the device.

Each finger 28 is provided with an external notch 34 in the edge 32 and these notches receive an endless spring 36 wholly below the gripping edge 32. The spring 36 exerts a constant pressure radially inwardly on the fingers 28 so as to return them to a smaller total diameter upon backing off on the fastener 22. This action also of course separates the plate 10 from the plate 18.

The two plates 10 and 18 are also provided with the generally triangularly arranged grooves 38 at their facing surfaces, so that the spring 36 may be received therein and the two plates brought together flatly in contacting relation as shown in Fig. 4 for maximum adjustment of the gripping fingers.

The operation of the device is relatively simple and comprises merely turning the fastener 22 so as to adjust the plates 10 and 18 to and from each other with consequent adjustment of the gripping fingers 28. This device may be inserted, as for instance in a bored workpiece w (see Fig. 7), and then it may be adjusted by the fastener 22 as described to grip the internal surface of the bore in the workpiece. At the same time, the drill guide-plate 40 may be centered on the head 12, whether it is in the form of a ring as in Fig. 1 or a solid plate as in Figs. 4 and 5. The drill plate 40 may be secured in any way desired as by cap screws or the like 42 taking into tapped holes in plate 10 as shown at 44.

An arbor as indicated at 46 may be applied to for instance plate 18 also by cap screws, if desired, and then the device is used as an internal chuck in a lathe or other machine tool. In this case, it is preferable to use the tailstock 48 taking into the conical hole 26 in the nut 24, in which case of course the work held will be clamped extremely accurately and firmly between the headstock and tailstock of the lathe. The arbor 46 may be integral with plate 18 if desired.

Having thus described my invention and the advantages thereof, I do not wish to be limited to the details herein disclosed, otherwise than as set forth in the claim, but what I claim is:

An internal chuck or the like comprising a pair of circular axially aligned plates, means to draw the plates toward each other, a plurality of radially arranged slots in each plate, said slots being inclined to the axis of the plates and appearing in facing surfaces thereof, each respective pair of slots in the two plates together forming a triangular adjustable recess, a triangular gripping finger in each recess, each finger having a pair of relatively inclined surfaces engaging the bottoms of its respective pair of slots, resilient means to tend to draw the fingers radially inwardly and the plates apart, said means to draw the plates toward each other expanding the diameter of the chuck to grip an internal surface, and means on one plate to be secured to an additional support, a peripheral slot in each finger, an endless spring in the slots, and means in the facing surfaces of the two plates to receive the spring in contacting face to face relation of the plates under maximum adjustment of the fingers.

References Cited in the file of this patent

UNITED STATES PATENTS

| Number | Name | Date |
|---|---|---|
| 1,495,451 | Starke | May 27, 1924 |
| 1,777,316 | Kupfner | Oct. 7, 1930 |
| 2,078,416 | Sauer | Apr. 27, 1937 |
| 2,226,078 | Spahn | Dec. 24, 1940 |
| 2,532,934 | Overton | Dec. 5, 1950 |

FOREIGN PATENTS

| Number | Country | Date |
|---|---|---|
| 166,107 | Germany | 1905 |